(No Model.)
N. McGOLDRICK.
CHECK HOOK.
No. 332,269. Patented Dec. 15, 1885.
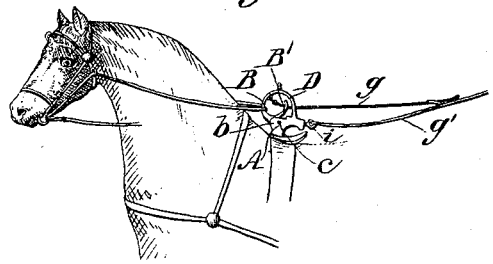
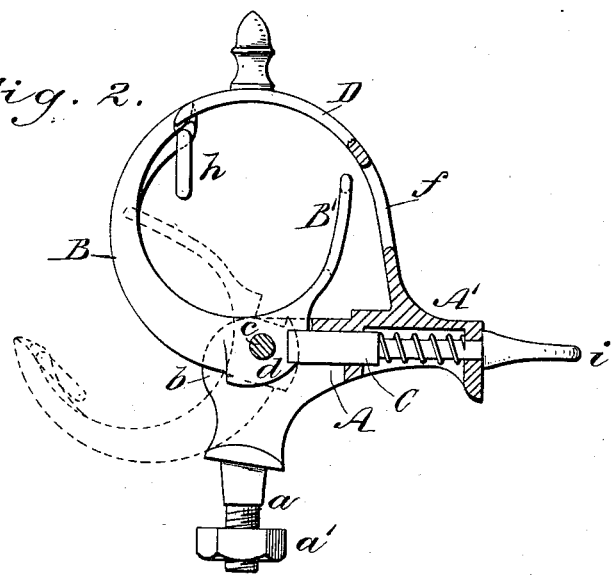
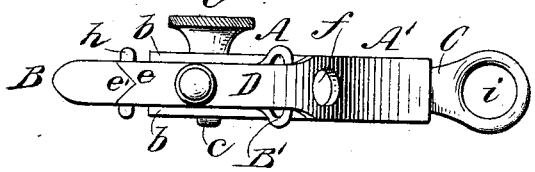
WITNESSES:
INVENTOR:
N. McGoldrick
BY Munn & Co
ATTORNEYS.

UNITED STATES PATENT OFFICE.

NEAL McGOLDRICK, OF BROOKLYN, NEW YORK.

CHECK-HOOK.

SPECIFICATION forming part of Letters Patent No. 332,269, dated December 15, 1885.

Application filed April 23, 1885. Serial No. 163,130. (No model.)

*To all whom it may concern:*

Be it known that I, NEAL McGOLDRICK, of Brooklyn, in the county of Kings and State of New York, have invented a new and Improved Check-Line Holder, of which the following is a full, clear, and exact description.

This invention relates to certain improvements on Letters Patent No. 309,165, granted December 9, 1884, to F. J. Smith, in which a pivoted check-hook is engaged by a spring-pressed bolt, which is connected to a line reaching back to the vehicle, the said line being connected to the check-rein by a strap passing through a rearward extension of the check-hook; and the invention consists of the construction, arrangement, and combination of parts, all as hereinafter described and claimed.

Reference is to be had to the accompanying drawings, forming part of this specification, in which similar letters of reference indicate corresponding parts in all the figures.

Figure 1 is a side elevation of my improved check-rein clip as it appears upon the harness and holding the check-rein. Fig. 2 is an enlarged partly-sectional elevation of the clip, and Fig. 3 is a plan view of the same.

A represents the body of the clip, which is adapted to be attached to the saddle-tree of a harness by the bolt or shank $a$ and nut $a'$. The body A is formed with the cheek-pieces $b\ b$. The check-hook B is placed between these cheek-pieces $b$, and is held upon the pivot $c$, which is by preference a thumb-screw formed with a head, $c'$, so that it may be conveniently removed for detaching the hook B from the body A. The hook B is held in position for holding the check-rein in the position shown in full lines in Fig. 1 by a locking-bolt or spring-catch, C, the inner end of which is adapted to engage with the notch $d$, formed in the hook back of the pivot $c$. The spring catch or bolt C is held in suitable apertures formed in the rear extension, A′, of the body A, and this extension is formed or provided with the upwardly-extending curved plate D, against which the point of the hook B closes for retaining the check-rein. The end of the plate D is notched, as shown at $e$, to receive the point $e'$ of the hook $b$, to prevent lateral displacement of the hook and plate when the hook is closed, as will be understood from Fig. 3, and an aperture, $f$, is formed in the plate D to serve as a guide to the short line $g$, which is attached to the ring $h$, attached to the hook B, for closing the hook. The line $g$ is attached to the line $g'$, which is attached to the eye $i$ of the spring catch or bolt C and extends back to the vehicle. A tail piece or loop, B′, is formed upon or attached to the rear part of the hook B, and through it the short line $g$ passes, and it serves as an additional guide to the said line; but this loop may be omitted, if desired. The short line $g$ will be provided with a snap-hook for convenience in attaching it to the ring $h$, and in use the check-rein will be put in the hook, and the line $g$ attached to ring $h$ over the line. The check-rein being in the hook and the hook closed, in order to uncheck the horse the driver will first draw backward upon the line $g'$ to disengage locking-bolt C from the notch $d$. Then the line $g'$ will be slightly raised to give slack to the line $g$, and then let forward, which will permit hook B to turn on its pivot to the position shown in dotted lines in Fig. 2, which will let the check-rein out of the hook; but the rein will still be retained by the short line $g$, which will slack sufficiently to give freedom to the horse's head.

In order to recheck the horse it is only necessary to draw backward upon the line $g'$, which will cause the short line $g$ to first draw the check-rein back into the hook B, and then turn the hook upward on its pivot until it is retained by the bolt C. In this manner the horse may be unchecked and checked up again from the vehicle without stopping the horse and without getting out of the vehicle.

Having thus described my invention, I claim as new and desire to secure by Letters Patent—

1. The body A, provided with locking-bolt C, in combination with the hook B, pivoted to the body and formed with notch $d$, and provided with means, substantially as described, for attaching the line $g$ to the point of the hook, substantially as described.

2. The hook B, pivoted in the body A, in combination with the plate D and locking-bolt C, substantially as described.

3. The hook B, formed with loop B' and notch $d$, and pivoted in the body A and provided with the ring $h$, in combination with locking-catch C and apertured plate D, substantially as described.

4. The plate D, notched at $e$, in combination with pivoted hook B and locking-bolt C, the hook being pointed, as at $e'$, substantially as and for the purposes set forth.

NEAL McGOLDRICK.

Witnesses:
 EDWARD GILLESPIE,
 THOS. McGOLDRICK.